United States Patent [19]
Kratel et al.

[11] 3,868,345
[45] Feb. 25, 1975

[54] ELASTOMERS MADE FROM HARDENABLE MASSES BASED ON DIORGANOPOLYSILOXANES

[75] Inventors: Günter Kratel, Sankt Mang; Günter Stohr, Kempten; Georg Vogt, Sankt Mang; Wolfgang Hechtl, Burhausen, all of Germany

[73] Assignee: Elektroschemelzwerk Kempten GmbH, Munich, Germany

[22] Filed: Mar. 8, 1973

[21] Appl. No.: 339,261

[30] Foreign Application Priority Data
Mar. 9, 1972 Germany.............................. 2211377

[52] U.S. Cl............................................. 260/37 SB
[51] Int. Cl............................................. C08g 51/04
[58] Field of Search.............. 260/37 SB; 106/308 Q

[56] References Cited
UNITED STATES PATENTS
3,004,859   10/1961   Lichtenwalner............. 260/37 SB X
3,128,196   4/1964   Pierpoint..................... 260/37 SB X
3,464,951   9/1969   Hittmair et al................. 260/37 SB

*Primary Examiner*—Lewis T. Jacobs
*Attorney, Agent, or Firm*—Allison C. Collard

[57] ABSTRACT

Elastomers made from masses hardenable at room or slightly higher temperature, based on diorganopolysiloxanes and containing reinforcing fillers of $SiO_2$ of finest particle size reacted with silicon compounds, said reaction being carried out under mechanical impact to increase the bulk weight of the resulting $SiO_2$ to 150–320 grams per liter, which treatment may, in some cases, be followed by treatment to decrease the bulkweight of the $SiO_2$ to 20–85 grams/liter. The elastomers have unusual strength properties against continued tearing, breaking, elongation, and tensile strength.

9 Claims, No Drawings

ELASTOMERS MADE FROM HARDENABLE MASSES BASED ON DIORGANOPOLYSILOXANES

The present invention relates to elastomers made by the use of masses based on diorganopolysioxanes and hardenable at room temperature or slightly higher temperatures. The masses contain organosiloxy groups are therefore hydrophobic, $SiO_2$ being therein distributed in the size of finest particles serving as a reinforcing filler.

In the conventional preparation of diorganopolysiloxane elastomers with excellent strength, masses are used, based on diorganosiloxanes which are hardenable to yield elastomers at room temperature or slightly higher temperatures. These masses contain as fillers, known types of hydrophobic silica of fine particle size, which were prepared by reaction with organosilicon compounds in absence of water, or in the presence of only small amounts of water. For a description, see German Laid Open Pat. No. 1,951,620 of May 6, 1971. However, in order to obtain high strength, these known fillers have to be used in amounts of more than 15 percent by weight, calculated on the total weight of the hardenable masses, yielding the elastomers. With such comparatively high amounts of the known reinforcing fillers of the above-described kind, or with the use of more than 12 percent by weight, calculated on the total weight of the hardenable masses of fine particle silica which has not been reacted with organosilicon compounds, the masses yielding elastomers are no longer sufficiently capable of flowing; or they are too highly viscous to permit processing by casting or brushing without simultaneous use of solvents. They are therefore not useful, particularly for making joints impermeable. Hydrophobic fillers, which are prepared by reaction of an aqueous silica sol with organohalogensilanes (see German Laid Open Patent No. 1 903 904 of Aug. 27, 1970) are free of the above mentioned disadvantage. However, the use of aqueous silica sols as starting product for making reinforcing fillers has other shortcomings, such as the comparatively high expense of preparing and shipping such sols.

It is the object of the present invention to provide a process which overcomes the disadvantages of the known methods in making elastomers from hardenable masses on the basis of diorganopolysiloxanes. The reinforcing fillers according to the invention are made from silica which is not dispersed in water or substantial amounts of water in the form of a sol. The fillers made according to the invention may be used not only in amounts of up to 15 percent by weight, but up to 40 percent by weight, calculated on the total weight of the masses yielding elastomers by hardening, without making the masses, containing such high quantities of fillers, too undesirably viscous.

The invention therefore relates to elastomers made from masses, hardenable to elastomers at room temperature or slightly higher temperatures, with or without the use of cross-linking agents. The masses can be stored in the absence of water, but will harden upon contact with water. The masses are based on diorganopolysiloxanes having reactive terminal units, and contain fillers, which consist at least partly of solid $SiO_2$ reacted with organosilicon compounds. The reacted $SiO_2$ is treated either preparatory to, or during the reaction, by providing a mechanical impact on the reaction mixture. This causes an increase in the bulk weight of the $SiO_2$ reacted with the organo silicon compounds of about 150 to 320 grams per liter. In some cases, the weight of the $SiO_2$, when treated subsequently by impact means, decreases to 20 to 85 grams per liter.

The masses to be employed in this invention are diorganopolysiloxanes which have been known to yield hardenable masses at room temperature, or slightly higher temperatures. They may be illustrated by the general formula:

$$Z_nSi(R)O_{3-n}[Si(R_2)O]_xSi(R)_{3-n}Z_n$$

wherein R stands for the same or different monovalent hydrocarbon radicals, which may or may not be substituted, Z is a hydroxyl group, a hydrolysable group and/or a hydrolysable atom, or, in case of masses hardenable at slightly raised temperatures, an alkenyl group; $n$ is 1, 2, or 3; and $x$ an integer having the value of at least 1 (one).

Within or along the siloxane chain in the formula given above, other siloxane units may be present but usually are not shown in such formulas. They are mostly impurities. They are diorganosiloxane units, such as ones having the formulas $RSiO_{3/2}$, $R_3SiO_{1/2}$, and $SiO_{4/2}$, R having in any case, the meaning above indicated. The amount of these other siloxane units should not exceed 10 mol percent.

Examples for hydrocarbon radicals R are alkyl radicals, as methyl, ethyl, propyl, butyl, hexyl and octyl radicals; alkylene radicals, e.g. vinyl, allyl, ethylallyl and butadienyl radicals; and aryl, such as phenyl and tolyl radicals.

Examples for substituted hydrocarbon radicals R are especially halogenated hydrocarbons, such as the 3,3,3-trifluoro radical, chlorophenyl- and bromotolyl radicals, and cyanoalkyl, such as the beta-cyanoethyl radical.

Examples for polymeric (called sometimes "modifying") substituted and unsubstituted hydrocarbon radicals R are polystyryl, polyvinylacetate, polyacrylate, polymethacrylate, and polyacrylnitril radicals, attached to Si by means of carbon.

At least the preponderant amount of radicals R are methyl groups, especially since these are the easiest available. The other groups, which may be present, are especially vinyl and/or phenyl groups.

Particularly for cases where masses are used, which, in the absence of water, yield storable elastomers, and in the presence of water yield elastomers by hardening at room temperature, Z stands mostly for hydrolysable groups. Examples for such groups are: Amino, amido, aminoxy, oxim, alkoxy, alkoxy-alkoxy (e.g. $CH_3OCH_2CH_2O-$), alkenyloxy (e.g. $H_2C=(CH_3)CO-$) acyloxy and phosphate groups. Especially because of their easy accessability, groups peferred for Z are acyloxy groups, particularly acetoxy groups. However, oxim groups, such as shown in the formula $-ON=C(CH_3)(C_2H_5)$, will likewise lead to excellent results.

Examples for hydrolysable atoms Z are halogen and hydrogen atoms.

Examples for alkenyl groups Z are especially vinyl groups.

As mentioned above, the best results are obtained when the hardened masses which yield elastomers are such that they may be processed by casting, or brushing without simultaneous use of solvents. Thus, the viscosity of the diorganopolysiloxanes to be used according to the invention, should not exceed 500 000 cP at 25°C and preferably 150 000 cP at 25°C. It is possible to use mixtures of several diorganopolysiloxanes. Organosilicon compounds, which are to be reacted with solid SiO₂ in fine particle size, may also be used. Preferred are those of the general formula:

$$(R_3Si)_aZ,$$

wherein R has the same meaning as indicated above, $a$ is 1 or 2, and Z represents halogen, hydrogen or a radical of the formula —OH, —OR, —NRX, —ONR₂— SR, — OOCR, —O—, —N(X)—or —S—, wherein R is as defined above and X is hydrogen or stands for the same radicals as R. Examples for such preferred organosilicon compounds are: Hexamethyldisilazane, trimethylsilane, trimethylchlorosilane, trimethylethoxysilane, triorganosilymercaptanes, such as, trimethylsilylmercaptane, triorganosilylacylate, e.g., vinyldimethylacetoxysilane, triorganosilylamines, e.g., trimethylsilylisopropylamine, trimethylsilylethylamine, dimethylphenylsilylpropylamine and vinyldimethylsilylbutylamine, triorganosilylaminoxy compounds, e.g., diethylaminoxytrimethylsilane and diethylaminoxydimethylphenylsilane, also hexamethyldisiloxane, 1,3-divinyltetramethyldisiloxane, 1,3-diphenyltetramethyldisiloxane and 1,3-diphenylhexamethyldilazane.

Other examples for organosilicon compounds reacted with the fine particle size SiO₂ according to the invention are dimethyldichlorosilane, dimethyldiethoxysilane, dimethyldimethoxysilane, diphenyldiethoxysilane, vinylmethyldimethoxysilane and octamethylcyclotetrasiloxane and/or which contain in each of the terminal units dimethylpolysiloxanes with 2–12 siloxane units per molecule, and having a hydroxyl group linked by Si. Mixtures of various organosilicon compounds may be reacted with the SiO₂.

It is one of the further advantages of the invention that excellent results may be obtained when, instead of the difficult obtainable hexamethyldilazane, trimethylethoxysilane is used. The latter compound is therefore preferred as a reactant with the solid, fine particle size SiO₂.

The organosilicon compounds reacted with the SiO₂ of finest particle size are used in amounts of 3 to 25 percent by weight, especially 4 to 8 percent by weight, calculated on the weight of the SiO₂ to be reacted.

The expression "solid" in connection with the SiO₂ to be used according to the invention is supposed to indicate that SiO₂ is not used as a sol, but in air dry state, apart from some adsorbed water, before it is contacted with water, and before it is reacted with the organosilicon compounds. In the specification and claims, the expression "dry" is not used instead of solid, because when the reaction is speeded up with the organosilicon compounds, resulting in the increase in bulk weight, 0.3 to 3 percent by weight of water is preferably added to the SiO₂, calculated on the latter's weight, in addition to the previously adsorbed water, if any.

The solid fine particle size SiO₂ preferably has a surface of at least 50 m²/g, and more particularly, at least 150 m²/g, measured by nitrogen adsorption according to the method described in ASMT special technical bulletin No. 51, 1941, page 95 and following, mostly designated BET method. The SiO₂ in question is mostly obtained by pyrogenic methods, and is called in American and British papers "fume silica"; one such SiO₂ is prepared by hydrolysis of silicon tetrachloride at temperatures above 800°C. Other examples of SiO₂ having a surface of at least 50 m²/g, are dehydrated silica gels, whose structure is unchanged; also xerogels and precipitated SiO₂ with a surface of at least 50 m²/g. Mixtures of different kinds of SiO₂ may be used. The bulk weight (DIN/Deutsche Industries Norm 53 468) of pyrogenically obtained SiO₂ is 20 to 85 g/l without treatment for increasing the bulk weight.

The increase in the bulk weight of the SiO₂, before and/or during its reaction with organosilicon compound, to 150 – 320 g/l by mechanical impact treatment is preferably brought about by means effecting a comminution of the SiO₂ while exerting mechanical pressure thereon. Such mechanical means are edge or pug mills, mills having grinding bodies, such as ball mills, for example, ball mills with stirrers, tube mills, cone mills, oscillating mills, and roller mills, or rollers themselves. Ball mills are preferred because they are most frequently available.

Air mills or jet mills, that is, mills in which the particles of the goods are only comminuted by mutual friction, are not suitable, because the treatment in these mills does not result in an increase in bulk weight (See German Laid Open Pat. No. 1,048,889, col. 4.).

The increase in bulk weight, which occurs in any case, must not be less than 150 g/l, because the fillers obtained would impart to the masses to be hardened, an undesirably high viscosity, even in comparatively small amounts. On the other hand, 320 g/l must not be exceeded, because the fillers would then not be useful for yielding elastomers having high strength. The extent of the increase in bulk weight rises with the duration of the mechanical impact. The weight may easily be controlled by taking specimens and determining the bulk weight of the specimens.

Mills with grinding bodies are generally not equipped with heating means or pressure regulating means, namely, pressure differing from atmospheric. The reaction of the SiO₂ with the organosilicon compound is therefore mostly carried out at room temperature and the pressure of the ambient atmosphere is thus at or about 760 mm Hg. However, if possible and desirable, other temperatures in the range of 15° to 150°C, and other pressures may be applied.

Instead of water, or preferably together with water, other known catalysts may be used to promote the reaction of SiO₂ with organosilicon compounds, such as HCl, amines, e.g., n-primary butylamine, and/or metal compounds, such as, titanium tetrachloride or dibutyl tindilaurate.

The fillers which are made by reaction of organosilicon compounds with the SiO₂ treated either preparatorily or simultaneously by mechanical impact resulting in increase of the bulk weight of the SiO₂ to 150–320 g/l are mixed with diorganopolysiloxanes and, if desired, other substances, whereby the masses are obtained which will harden at room temperature or slightly higher temperatures to yield elastomers when water has access thereto. In the absence of water, the masses remain in storage unchanged. Cross-linking agents are sometimes added when the mixing with diorpolyganosiloxanes is carried out, which may be effected in any known manner, for instance, in mechanical mixers. The mixing is rapidly and easily performed, regardless of the order in which the components are added.

When less efficient mixing devices are used, or when the fillers should be brought rapidly into a state of finest dispersion in the diorganopolysiloxanes and other substances, the fillers having been made by reaction of $SiO_2$ with the organosilicon compounds under mechanical impact of the reaction mixture to increase the bulk weight of the $SiO_2$ to 150–320 g/l, it is advantageous to reduce the bulk weight of the reacted $SiO_2$ once more to 20–85 g/l by mechanical impact, before putting it to further use. Such mechanical impact to reduce the bulk weight may be effected by pin mills, air mills, jet mills or impact mills. The extent of the reduction of the bulk weight is preferably 50-80 g/l.

In some cases, it may be advisable to bring about the reduction of the bulk weight of the $SiO_2$ which has been reacted with organosilicon compounds, in the presence of organosilicon compounds capable of reacting with solid, fine particle size $SiO_2$ — as fully described above —; for instance, with trimethylethoxysilane and, if desired, in the presence of agents promoting the reaction, such as, water.

The fillers are preferably added in amounts of at least 5 percent by weight, calculated on the total weight of the masses to be hardened.

When the only reactive terminal units contained in the diorganopolysiloxanes are units which have OH– groups attached to Si, the diorganopolysiloxanes have to be reacted with cross-linking agents, if desired, in the presence of a condensation catalyst, in order to harden them in a manner known per se, or to convert them into hardenable masses yielding elastomers by the water contained in the air, or, if necessary, addition of more water.

Examples for suitable cross-linking agents are silanes of the general formula $$R_{4-t}SiZ'_t.$$ 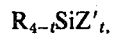

wherein R stands for the groups mentioned above. Z' is a hydrolysable group and/or a hydrolysable atom, and t is 3 or 4. The above-mentioned examples for hydrolysable groups and atoms designated by Z are fully applicable for hydrolysable groups or atoms Z'.

Examples for silanes of the above formula are: methyltriacetoxysiliane, isopropyltriacetoxysilane, isopropoxytriacetoxysilane, vinyltriacetoxysilane, methyltrisdiethylaminooxysilane, methyltris(-cyclohexylamino)-silane, methyltris (-diethylphosphateo)-silane and methyltris(-methylethylketoximo)-silane.

Instead of, or in mixture with the silanes of the above formula, polysiloxanes may be further used, which contain per molecule, at least 3 Z' groups or atoms, respectively, wherein the silicon valences not saturated by Z' groups or Z' atoms, are saturated by siloxane oxygen atoms, or, sometimes, by R groups. The best known samples for cross-linking agents of the last mentioned type are polyethyl silicate, having an $SiO_2$ content of about 40 percent by weight, hexaethoxydisiloxane, and methylhydrogenpolysiloxanes.

The best known examples for condensation catalysts are tin salts of fatty acids, e.g., dibutyltin laurate, dibutyltin diacetate, and tin (II) octoate.

When the only reactive terminal units contained in the diorganopolysiloxanes are units which contain alkenyl groups, the hardening to elastomers may be effected in a known manner with organopolysiloxanes, which have at least 3 Si-linked hydrogen atoms per molecule, e.g., methylhydrogenpolysiloxane, in the presence of catalysts promoting the addition of alkenyl groups to Si-linked hydrogen, for instance, platinum-(IV)-chloric acid. The masses obtained are hardenable (LTV) at room temperature or slightly higher temperature (mostly 50°–80°C).

Finally, a further example for hardening to elastomers is the one by means of polycyclic organopolysiloxanes in the presence of equilibrium-promoting catalysts, e.g., phosphorus nitrilchlorides.

It goes without saying that the masses hardenable to yield elastomers may contain, in addition to diorganosiloxanes, fillers used according to the invention, cross-linking agents, and cross linking catalysts. Sometimes, conventional substances are also used frequently in this art. Examples are fillers having a surface below 50 $m^2/g$, such as, quartz powder, diatomaceous earth, so-called molecular sieves, such as, sodium-calcium-aluminum silicate. Furthermore, more substances, like circonium silicate and calcium carbonate, also untreated, pyrogenically produced $SiO_2$, organic resins, such as polyvinylchloride powder, organopolysiloxane resins, fibrous fillers, e.g., asbestos, glass fibers and organic fibers, pigments, soluble dyes, fragrant substances, corrosion inhibitors, agents which stabilize the masses against water, e.g., acetic anhydride, agents delaying hardening, e.g., benzotriazol, and plasticizers, e.g., dimethylpolysiloxanes end-blocked by trimethylsiloxy groups are used.

The figures stated in the following examples designating strength against continued tearing, were measured in accordance with ASTM D–624, form B; the Breaking elongation and Tensile strength according to the DIN 53504 with standard test bar III.

EXAMPLE I a. 200 grams of $SiO_2$ pyrogenically obtained in the gaseous phase having a BET-surface of 200 $m^2/g$ and a bulk weight of 65 g/l (obtainable from the firm Elektroschmelzwerk Kempten, Germany, under the designation "HDK") are mixed with 15 g trimethylethoxysilane and 2 g water and placed into a ball mill of porcelain having a capacity of 5 l, of which 1.5 are filled with porcelain balls having a diameter of 15 – 40 mm. After having replaced the air in the mill by HCl, the mill is operated for 2 hours at room temperature at 70 rpm. Thereafter, the contents of the mill are heated to 250°C for 2 hours in order to expel volatile components from the product, among others, trimethylethoxysilane. The filler so obtained has the bulk weight 280 g/l (DIN 53 468).

b. In a planetary mixer, the following components are mixed in the order given below, with subatmospheric pressure applied and water being excluded.

128.0 g dimethypolysiloxane having in each terminal unit one hydroxyl group linked to Si, and having a viscosity of 80 000 cP at 25°C;

56.0 g dimethypolysiloxane end-blocked by trimethylsiloxy groups and having a viscosity of 35 cP at 25°C;

32.0 g of the filler, whose preparation was described under a);

12.8 g vinyltriacetoxysilane;

12.0 g of the filler whose preparation was described under a); and 6.2 g dibutyltin laurate.

A soft mass is obtained which is firm, as proved by testing according to "Preliminary Guidelines for Testing Joint-sealing Masses in Assembling Concrete Parts" ("Verlaeufige Richtlinien fuer die Prufung von Fugenmassen im Betonfertigteilbau") number 2.3 (Edition of June 1967, published in "Beton-und Stahlbau," volume 62, 1967), since it does not flow out of the vertical rail.

The properties of elastomers determined after two days standing of the mass in air at room temperature, are as follows:

| Strength against | |
|---|---|
| continued tearing | 28.9 kg/cm |
| Breaking elongation | 490% |
| Tensile strength | 52.0 kg/cm$^2$ |

Comparison Test I a'. 200 grams of SiO$_2$ pyrogenically obtained (fume silica) in the gaseous phase having a BET-surface of 200 m$^2$g and a bulk weight of 65 g/l (obtainable from the firm Elektroschmelzwerk Kempten, Germany, under the designation HDK) are mixed with 15 g trimethylethoxysilane and 2 g water. The obtained mixture is heated in a closed vessel eight hours to 100°C and then heated to 250°C to eliminate volatile components from the product. The obtained filler has a bulk weight of 65 g/l.

b'. The operation described in Example I under (b) is repeated with the difference that instead of first adding 32 g of the filler described in Example I under (a), there are added 16 g of the filler made in accordance of a') above described, no further filler being added. (More than 16 g cannot be added, since otherwise no soft mass would be obtained.) The mass obtained is soft and firm.

The properties of the elastomers determined after three days' standing of the masses in air, are as follows:

| Strength against | |
|---|---|
| continued tearing | 9.1 kg/cm |
| Breaking elongation | 360% |
| Tensile strength | 15 kg/cm$^2$ |

Comparison Test II

The operation described in Example I under (b) is repeated, but with the difference that instead of adding first, 32 g of the filler described in Example I under (a), 16 g "fume silica" are added having a bulk weight of 65 g/l and a BET surface of 200 m$^2$/g. After this component has been mixed in, the mass is so hard that no further components can be mixed into it.

EXAMPLE II

In a planetary mixer, 53.7 parts by weight of dimethylpolysiloxane having in each of the terminal units one hydroxyl group linked to Si, and having a viscosity of 50,000 cP at 25°C, are mixed under subatmospheric pressure and exclusion of water with 21.0 parts by weight of dimethylpolyoxysilane end blocked by trimethylsiloxy groups, 21.4 parts by weight of the filler whose preparation was described in Example I under (a); also admixed are 3.9 parts by weight of vinyltriacetoxysilane. The dimethylpolysiloxane end blocked by trimethylsiloxy groups has a viscosity of 1000 cP at 25°C.

The properties of the elastomers which were determined after 3 days' standing of the masses in air, are as follows:

| Strength against | |
|---|---|
| continued tearing | 12.8 kg/cm |
| Breaking elongation | 480% |
| Tensile Strength | 28 kg/cm$^2$ |

While only a few examples have been given in the above, it should be understood that they are given by way of illustration only and not as a limitation of the elastomers made according to the invention.

What is claimed is:

1. In elastomers made from masses hardenable at room temperature or slightly higher temperatures, said masses being based on diorganopolysiloxanes and containing reinforcing fillers of SiO$_2$ having a surface area of at least 50 m$^2$/g reacted with organosilicon compounds in amounts of 3–25 percent by weight, the improvement that the organosilicon compounds used have the general formula $$(R_3Si)_aZ$$

wherein R stands for the same or different monovalent hydrocarbon radicals, $a$ is 1 or 2, Z represents a member of the group consisting of halogen, hydrogen and a radical of the formula —OH, —OR, —NRX, —ONR$_2$, —SR, —OOCR, —O—, —N(X)— and —S—, wherein R is as defined above, and X stands for hydrogen or the same radicals as R, said reaction being carried out under mechanical impact to increase the bulk weight of the resulting SiO$_2$ to 150–320 grams per liter.

2. Elastomers as defined in claim 1, wherein the treatment for increasing the bulk weight of SiO$_2$ is carried out before the SiO$_2$ is reacted with organosilicon compounds.

3. Elastomers as defined in claim 1, wherein the fillers of SiO$_2$ reacted with organosilicon compounds are added in the amount of at least 5 percent by weight of the hardenable masses.

4. Elastomers as defined in claim 1, wherein in the reaction of the organosilicon compounds with the SiO$_2$, 0.3 – 3 percent water are present calculated on the weight of the SiO$_2$.

5. Elastomers as defined in claim 1, wherein the impact to increase the bulk weight of the SiO$_2$ is effected by comminuting and pressure exerting means.

6. Elastomers as defined in claim 5, wherein the impact effecting means is of the type of a ball mill.

7. Masses for making elastomers as defined in claim 1, wherein the diorganopolysiloxanes used have the formula $$Z_n Si (R)O_{3-n} [Si (R_2) O]_x Si (R)_{3-n} Z_n$$

wherein R stands for the same or different monovalent hydrocarbon radicals, Z is a member selected from the group consisting of hydroxyl, a hydrolysable group, a hydrolysable atom, and alkenyl, $n$ is 1, 2 or 3 and $x$ an integer having the value of at least one.

8. Masses as defined in claim 7, wherein at least the preponderant part of R are methyl groups.

9. The elastomers as defined in claim 1 wherein the organosilicon compound used for reaction with SiO$_2$ is trimethylethoxysilane.

* * * * *